(12) United States Patent
Bronfer et al.

(10) Patent No.: US 7,016,445 B2
(45) Date of Patent: Mar. 21, 2006

(54) APPARATUS FOR AND METHOD OF CLOCK RECOVERY FROM A SERIAL DATA STREAM

(75) Inventors: Alexander Bronfer, Ramat Gan (IL); Eldad Falik, Dallas, TX (US); Haviv Ilan, Rosh Haayin (IL)

(73) Assignee: Texas Instruments Incorporated, Dallas, TX (US)

( * ) Notice: Subject to any disclaimer, the term of this patent is extended or adjusted under 35 U.S.C. 154(b) by 888 days.

(21) Appl. No.: 09/921,123

(22) Filed: Aug. 2, 2001

(65) Prior Publication Data

US 2003/0031283 A1 Feb. 13, 2003

(51) Int. Cl.
*H04L 7/00* (2006.01)

(52) U.S. Cl. ...................................................... 375/355

(58) Field of Classification Search ................. 375/354, 375/355, 364, 377, 226, 228, 359, 360, 371–374, 375/224, 316, 340, 357; 342/147; 340/146.2, 340/500, 501, 514, 516, 527; 711/129, 117, 711/118; 369/60.01; 327/91
See application file for complete search history.

(56) References Cited

U.S. PATENT DOCUMENTS

| | | | |
|---|---|---|---|
| 4,139,898 A | * | 2/1979 | Tanaka ..................... 353/26 A |
| 4,972,161 A | | 11/1990 | Davies et al. |
| 5,220,201 A | * | 6/1993 | Kawasaki et al. .......... 327/156 |
| 5,761,255 A | | 6/1998 | Shi |
| 5,774,470 A | * | 6/1998 | Nishiya et al. ............. 714/703 |
| 5,907,587 A | | 5/1999 | Sokoler |
| 6,181,660 B1 | * | 1/2001 | Hirayama et al. ......... 369/59.1 |
| 6,266,799 B1 | | 7/2001 | Lee et al. |

* cited by examiner

*Primary Examiner*—Tesfaldet Bocure
*Assistant Examiner*—Pankaj Kumar
(74) *Attorney, Agent, or Firm*—Ronald O. Neerings; Wade James Brady, III; Frederick J. Telecky, Jr.

(57) ABSTRACT

A novel and useful apparatus for and method of clock recovery from a serial data stream. The clock recovery mechanism of the present invention provides accurate and fast timing recovery while operative to filter out the effects of noise. The clock recovery mechanism clocks the received serial data into a shift register of N bits, where N is an even number equal to the oversampling factor of the data signal. A timing correction, generated during learning cycles, is applied during the subsequent correction cycle. The timing is adjusted during correction cycles by preloading the reference counter, from which the sampling clock is produced, such that its cycle is either shortened or extended by M clocks, where M corresponds to the required timing correction.

22 Claims, 5 Drawing Sheets

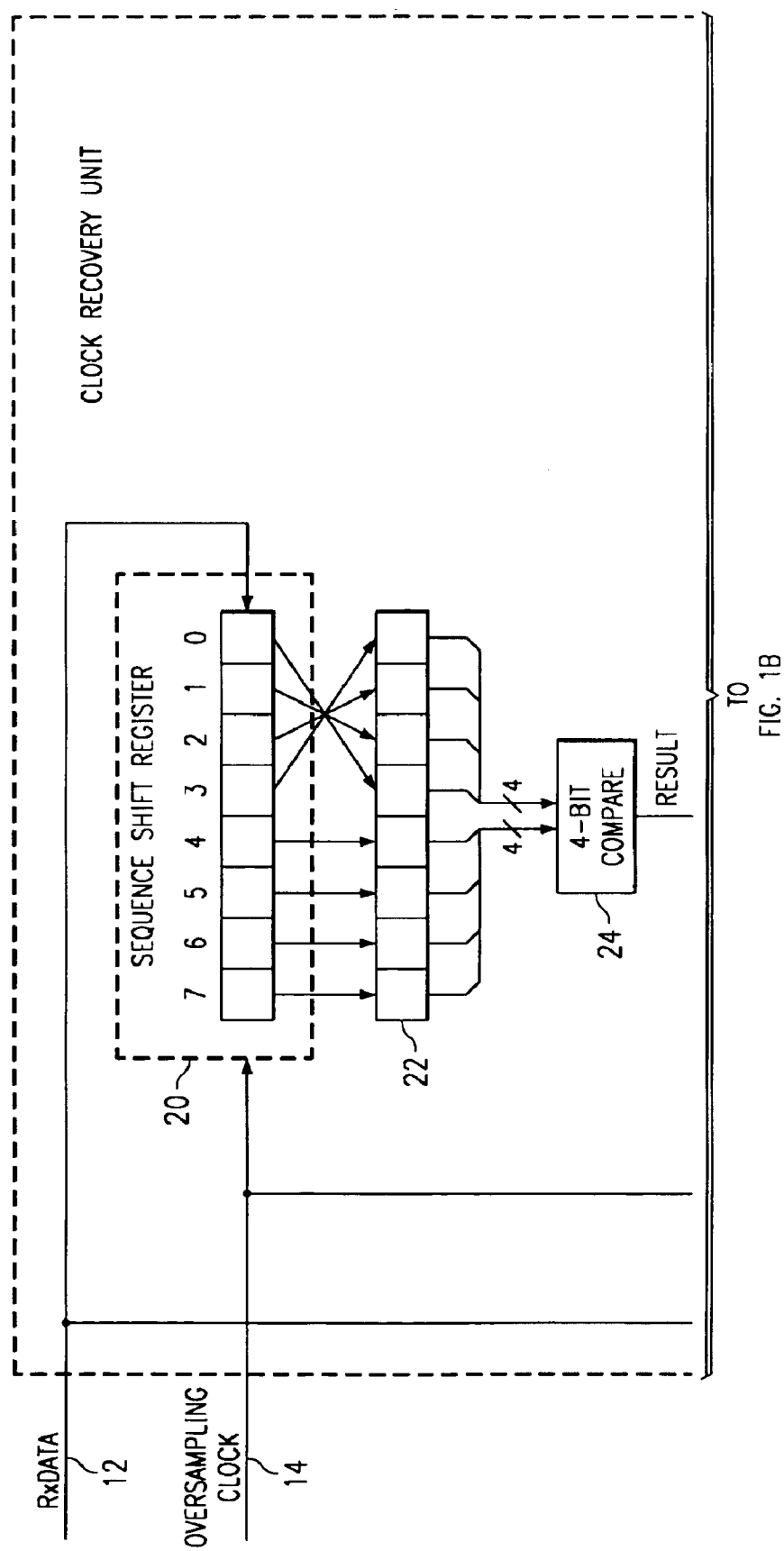

APPARATUS FOR AND METHOD OF CLOCK RECOVERY FROM A SERIAL DATA STREAM

FIELD OF THE INVENTION

The present invention relates generally to data communications systems and more particularly relates to an apparatus for and method of clock recovery from an input serial data stream.

BACKGROUND OF THE INVENTION

The demand for data communications services of all kinds is exploding worldwide due in large part to the explosive growth of the Internet. Each year many more hosts are added while the number of users seems to be growing without limit. The Internet enables communications using different techniques including remote computer login, file transfer, world wide web browsing, email, etc.

The demand is also growing for wireless services (i.e. cellular phones, two way pagers, cordless devices, etc.) and personal computing devices such as laptops, PDAs, etc. Many of these personal computing devices incorporate wireless communications circuitry to enable them to communicate via wireless networks (e.g., cellular or other broadband schemes) to WAN networks such as the Internet.

Many such wired and wireless products are adapted to receive and transmit serial data streams. It is common practice to send the serial data without a separate clock signal. It is thus the function of the receiver to extract the timing from the received data. There exist numerous prior art analog and digital based synchronization techniques for recovering the clock from received data in both wired and wireless type receivers. Typically, synchronization mechanisms having very high timing accuracy and fast acquisition are very complex and expensive.

There is constant pressure on manufacturers to reduce the cost of their communications products. One way of reducing the cost is to develop cheaper and simpler circuits to incorporate in products. Simple and low cost mechanisms for clock recovery are usually based on the detection of transitions in the received data signal. Such mechanisms, however, are sensitive to the noise and jitter that are commonly present in communications systems.

There is thus a need for a clock recovery mechanism that is capable of extracting the clock timing from a received serial data stream that is low cost and simple to implement and that exhibits reduced sensitivity to noise and jitter.

SUMMARY OF THE INVENTION

The present invention provides a novel and useful apparatus for and method of clock recovery from a serial data stream. The invention can be implemented in hardware, software or a combination of both. The present invention can be incorporated in a hardware-based circuit particularly suitable for use in portable computing devices such as cellular telephones and wireless connected PDAs.

The clock recovery mechanism of the present invention provides accurate and fast timing recovery while operative to filter out the effects of noise. The mechanism typically acquires the optimal timing for data sampling during a preamble, constructed intentionally for this purpose, that is received prior to the data payload. The invention, however, can continue to operate beyond the preamble and thus is able to also provide timing corrections throughout the data payload. Therefore, the invention is applicable to the reception of continuous data in addition to the reception of intermittent data as is the case with wireless packet transmission. One example of a wireless packet transmission scheme is the Bluetooth wireless protocol standard.

The clock recovery mechanism comprises clocking the received serial data into a shift register of N bits, where N is an even number equal to the oversampling factor of the data signal. The value of N is equal to the ratio of the oversampling clock rate and the data rate of the received serial data at the input of the receiver. The received data enters the shift register and is sampled at the rate of the receiver oversampling clock (nominally $f_s = N \cdot R_b$, where $R_b$ is the nominal rate of the received data.

The shift register is loaded anew every N sample clocks. A cycle can be either a learning cycle or a correction cycle. A timing correction, generated during learning cycles, is applied during the subsequent correction cycle. During a learning cycle, the shift register contents are processed as follows. The lower half (N/2 lower bits) is rotated (LSB to MSB) and compared to the higher half by means of a N/2 bit comparator. The received data is also clocked into an integrator that functions to integrate the serial data.

The resultant comparator output combined with the sign of the integration result is used to determine the direction of the necessary timing correction. The gain (or magnitude) of the correction is determined by the magnitude of the integration result.

A correction circuit generates a value that is preloaded into a reference counter at the start of each correction cycle. The preload value is generated as a function of the direction and gain correction values. If the timing of the recovered clock is to be retarded, the reference counter is loaded with the value N−1 plus the gain correction. If the timing of the recovered clock is to be advanced, the reference counter is loaded with the value N−1 minus the gain correction. The decision whether to advance or retard the timing of the recovered clock signal is determined by the direction correction value. If the comparison result comes out equal, than no change is made to the timing of the recovered clock signal, i.e. a value of N−1 is loaded into the counter, since this indicates accurate or optimal timing. The reference counter is adapted to generate a transition between the N/2 and N/2−1 sample periods during both learning and correction cycles.

Thus, the timing is adjusted during correction cycles by preloading the reference counter, from which the sampling clock is produced, such that its cycle is either shortened or extended by M clocks, where M corresponds to the required timing correction.

Although the invention is intended for implementation in hardware, it can also be implemented in software. In one embodiment, a computer comprising a processor, memory, etc. is operative to execute software adapted to perform the dynamic packet filtering method of the present invention.

There is therefore provided in accordance with the present invention an apparatus for recovering the clock from an input serial data stream comprising an N bit sequence shift register adapted to receive the serial data, a comparator adapted to compare an upper half of the sequence shift register against a lower half thereof to produce a comparison result, an integrator adapted to integrate the input serial data stream to produce an integrator result, a correction circuit operative to generate a timing correction comprising direction and gain portions thereof based on the comparison result and the integrator result during a learning cycle and a clock generator circuit adapted to generate a recovered clock signal and to either retard, advance or not change the timing of the recovered clock signal in accordance with the timing correction during a correction cycle.

There is also provided in accordance with the present invention an apparatus for recovering the clock from an input serial data stream comprising means for initiating learning cycles during which a timing correction is generated and to initiate correction cycles during which the timing correction is applied to a recovered clock signal, an N bit sequence shift register adapted to receive the serial data, a comparator adapted to compare an upper half of the sequence shift register against a lower half thereof to produce a direction signal therefrom, an integrator adapted to integrate the input serial data stream to produce a gain signal, the integrator adapted to be reset at the start of each learning cycle, a correction circuit operative to produce during learning cycles direction and gain corrections based on the direction signal and the gain signal and a clock generator circuit adapted to generate the recovered clock and to adjust during correction cycles the timing of the recovered clock in accordance with the direction and gain corrections.

There is further provided in accordance with the present invention an apparatus for recovering the clock from an input serial data stream comprising an N bit sequence shift register adapted to receive the serial data, comparator means for comparing an upper half of the sequence shift register against a lower half thereof to produce a direction signal, an integrator adapted to integrate the input serial data stream to produce a gain signal, correction means for generating during a learning cycle a direction correction and a gain correction based on the direction signal and gain signal and a clock generator circuit adapted to generate a recovered clock signal whose timing is adjusted in accordance with the direction correction and gain correction during a correction cycle adapted to follow the learning cycle.

There is also provided in accordance with the present invention a method of recovering a clock from an input serial data stream, the method comprising the steps of initiating learning cycles during which a timing correction is generated and initiating correction cycles during which the timing correction is applied to a recovered clock signal, loading the serial data into an N bit sequence shift register, comparing an upper half of the sequence shift register against a lower half thereof so as to produce a direction signal therefrom, integrating the serial data stream so as to produce a gain signal, generating during learning cycles the timing correction comprising direction and gain corrections based on the direction signal and the gain signal and generating the recovered clock signal whereby the timing of the recovered clock is adjusted in accordance with the direction and gain corrections during correction cycles.

BRIEF DESCRIPTION OF THE DRAWINGS

The invention is herein described, by way of example only, with reference to the accompanying drawings, wherein:

FIGS. 1A and 1B is a block diagram illustrating an example implementation of the clock recovery mechanism of the present invention;

DETAILED DESCRIPTION OF THE INVENTION

Notation Used Throughout

The following notation is used throughout this document.

| Term | Definition |
| --- | --- |
| ASIC | Application Specific Integrated Circuit |
| CPU | Central Processing Unit |
| DSP | Digital Signal Processor |
| EEPROM | Electrically Erasable Programmable Read Only Memory |
| EEROM | Electrically Erasable Read Only Memory |
| EPROM | Erasable Programmable Read Only Memory |
| FPGA | Field Programmable Gate Array |
| LAN | Local Area Network |
| LSB | Least Significant Bit |
| LUT | Lookup Table |
| MSB | Most Significant Bit |
| PC | Personal Computer |
| PDA | Personal Digital Assistant |
| RAM | Random Access Memory |
| ROM | Read Only Memory |
| WAN | Wide Area Network |

Detailed Description of the Invention

The present invention provides an apparatus for and method of accurate and fast clock timing recovery from a serial data stream. The clock recovery mechanism acquires the optimal timing for use in sampling the received data. The invention can be implemented in hardware, software or a combination of both. The present invention can be incorporated in a hardware-based circuit particularly suitable for use in portable computing devices such as cellular telephones and wireless connected PDAs.

The clock recovery mechanism of the present invention provides accurate and fast timing recovery while operative to filter out the effects of noise. The mechanism is applicable to communication systems that utilize a preamble that is sent prior to the data payload. The main purpose of the preamble is for use by the receiver in extracting the clock to be used in sampling the data. The invention, however, can also be used to track the clock timing beyond the preamble thus providing timing corrections throughout the data payload. Thus, the invention is applicable to the reception of continuous data in addition to the reception of intermittent data, e.g., wireless packet transmission.

Figure 1B:
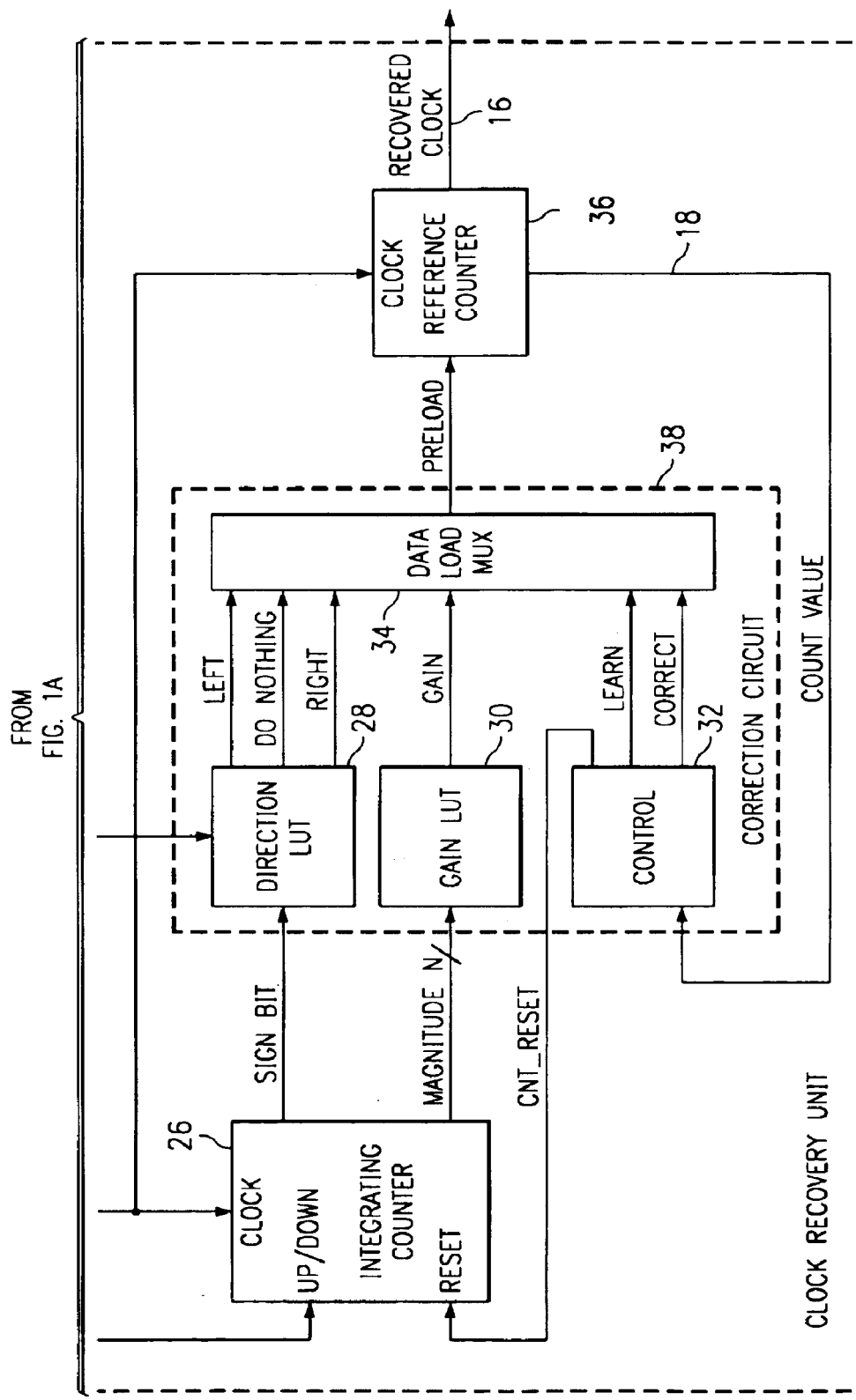

A block diagram illustrating an example implementation of the clock recovery unit of the present invention is shown in FIGS. 1A and 1B. The clock recovery unit, generally referenced 10 comprises a sequence shift register 20, parallel load register 22, compare circuit 24, integrating counter 26, correction circuit 38 and reference counter 36. It is noted that the clock recovery unit illustrated is presented as an example only and is not intended to limit the scope of the invention. One skilled in the electrical arts can construct other clock recovery circuit implementations, either in hardware, software or a combination of both to perform clock recovery using the principles of the present invention described herein.

In operation, the received data RxData 12 is clocked into the sequence shift register and the integrating counter. The received data may be provided by the front-end circuit of a communications receiver or transceiver. Typically, the received signal has been filtered prior to arriving at the clock recovery unit. The performance of the recovery mechanism is enhanced in such cases but the mechanism also operates with received data that has not been filtered.

The sequence shift register comprises a length of N bits where N is an even integer number equal to the oversampling factor of the data signal. The value of N is equal to the ratio between the oversampling clock rate and the data rate of the received serial data at the input of the receiver. The received data enters the shift register and is sampled at the rate of the receiver oversampling clock (nominally $f_s = N \cdot R_b$, where $R_b$ is the nominal rate of the received data. In the example embodiment presented herein, the data rate of the received data is 1 Mbps. The oversampling clock 14 is 8 MHz thus yielding a shift register length N of 8 bits.

Once the shift register is full, the contents are parallel loaded into a register. In accordance with the invention, the positions of the lower N/2 bits are reversed whereby the most significant bit of the lower N/2 bits becomes the least significant and so on. The most significant upper N/2 bits (i.e. the most significant N/2 bits) are compared with the lower N/2 bits (i.e. the least significant N/2 bits) by a N/2 bit comparator 24. The compare results can be either 'greater than' or 'less than' in which case they may be represented by a single bit. Alternatively, the result may comprise 'greater than,' 'less than' and 'equal' in which case two bits are required. The result is input to the correction circuit.

The RxData is also input to the up/down control of a ($\log_2 N+1$) bit counter 26 that functions as an integrator. The integrating counter is clocked by the same oversampling clock 14 used to clock the sequence shift register. Depending on the relative timing of the transitions in the data signal, the counter may reach values between −N and +(N−1). The output of the counter at the end of each cycle (i.e. N oversampling clocks) comprises the magnitude and sign of the integration result.

The sign of the integration result in combination with the comparator result determine the gain (i.e. the magnitude) the timing error. An integration result of −N or +(N−1) indicates accurate (i.e. optimal) timing while a result of zero indicates maximum timing error. The output of the integrator counter along with the comparison result described before are input to the correction circuit whose function is to generate the timing signals and preload value for the reference counter and the timing signals for the shift register.

The correction circuit comprises a direction determination circuit 28, gain determination circuit 30, control unit 18 and data load circuit 34. The direction and gain determination circuits and the data load circuit may be implemented using any suitable technique, e.g., passive or active logic, multiplexer, lookup table (LUTs), discrete logic, etc. or combination thereof. In addition, the control circuit may be implemented as discrete logic, state machine or other functionality equivalent circuitry.

The control circuit is operative to divide the operation of the correction circuit into learning and correction cycles. Preferably, learning and correction cycles alternate on a 50% duty cycle basis. It is also intended that other patterns with different duty cycle ratios may also be implemented without departing from the scope of the invention. For example, a correction cycle may follow two, three or more learning cycles. The control circuit is operative to indicate the current cycle via the LEARN and CORRECT timing signals.

The control circuit uses the internal value of the reference counter to determine the start and end of learning and correction cycles. The control circuit triggers a cycle change upon the count value of the reference counter reaching zero. The reference counter, driven by the oversampling clock, is a modulo N counter with preload capability whose output constitutes the recovered clock that is used in subsequent processing as the sample clock.

In operation, the reference counter is adapted to always output a positive transition between clock periods N/2 and N/2−1 regardless of the cycle. During learning cycles, the reference counter is always loaded with the value N−1. Thus, in this example, a learning cycle comprises 8 clock periods and a positive transition of the recovered clock occurs between clock periods 4 and 3. A negative always occurs at the end of the current cycle.

Corrections to the timing of the recovered clock signal are made by either retarding or advancing the timing of the output clock during correction cycles. The clock timing is retarded by loading the reference counter with a value higher than N−1 and is advanced by loading the reference counter with a value lower than N−1. The magnitude of the value (i.e. the gain) determines the degree of advancement or retarding. If the recovery clock is found to be accurate, no change is made to the timing during correction cycles, i.e. a value of N−1 is loaded into the reference counter. The magnitude to be added or removed from the recovered clock signal is determined by the gain LUT. The direction, i.e. advance, retard or no change, is determined by the direction LUT.

Note that the integrating counter is reset at the beginning of each learning cycle and the reference counter is preloaded at the start of each correction cycle.

The direction LUT is adapted to incorporate the data in Table 1 below. The output of the direction LUT comprises the adjustment to be made to the recovered clock. The possibilities include 'move to the left,' 'move to the right' or 'no change.' The input to the direction LUT comprises the sign bit from the integrator counter and the result of the comparison.

TABLE 1

Direction LUT Contents

| Sign Bit | Comparator Result | Direction of adjustment in recovered clock |
|---|---|---|
| + | > | Left |
| + | < | Right |
| +/− | = | No Change (Unknown) |
| − | > | Right |
| − | < | Left |

The outputs of the direction LUT are input to the data load multiplexer, the operation of which is described in more detail infra.

The gain LUT is adapted to provide the mapping from integrator magnitude to gain value. The gain values stored in the gain LUT can be determined by a user or host and programmed into the LUT. They may optionally be adjusted dynamically in accordance with one or more parameters. The gain values may also be set in accordance with the type of protocol in use. For example, with protocols employing relatively long preambles, it is preferable to reduce the gain. Synchronization of the recovered clock may take longer in such a case but in the presence of jitter and noisy reception the process would be more accurate due to the better filtering or averaging over time.

Higher gain settings can be used with protocols employing shorter length preambles in order to achieve synchronization more quickly. In other cases, the communications protocol may dictate a maximum number of cycles in which clock synchronization must be achieved. This imposes a constraint on the maximum gain value.

As a rule of thumb, however, the maximum gain setting may be set as ½ of the maximum error. For the case of N=8, the maximum error is 4 cycles, i.e. the timing error cannot be off by more than ½ the width of the sequence shift register.

The gain LUT is adapted to incorporate the data in Table 2 below. The output of the gain LUT comprises the adjustment magnitudes for the timing of the recovered clock. The gain ranges from a maximum at an integrator value of zero to a gain of zero at maximum integrator output. The input to the gain LUT comprises the magnitude from the integrator counter.

TABLE 2

Gain LUT Contents

| Magnitude of Integrator Counter | Gain |
|---|---|
| 0 | 2 |
| 1 | 2 |
| 2 | 2 |
| 3 | 1 |
| 4 | 1 |
| 5 | 1 |
| 6 | 1 |
| 7 | 0 |

Note that in this example, the maximum gain is set to 2. Other implementations of the clock recovery unit may program the gain LUT with other gain mappings without departing from the scope of the present invention. The outputs of the gain LUT are input to the data load multiplexer, the operation of which is described in more detail infra.

The data load multiplexer is operative to generate the value that is used to preload the reference counter at the start of each cycle. During learning cycles, the data load multiplexer is operative to load a value of N−1 to the reference counter. During correction cycles, the data load multiplexer is operative to load a timing correction value as a function of the 'left,' 'right,' 'no change' and 'gain' signals.

If the output of the direction LUT indicates a 'left' signal, then a value of [(N−1)−gain] is loaded into the reference counter causing the timing of the recovered clock to be retarded. If the output of the direction LUT indicates a 'right' signal, then a value of [(N−1)+gain] is loaded into the reference counter causing the timing of the recovered clock to be advanced. If the output of the direction LUT indicates a 'do nothing' signal, then a value of (N−1) is loaded into the reference counter, regardless of the value of the gain, thus causing no change to be applied to the timing of the recovered clock. Note that a signal of 'no change' indicates that the timing of the recovered clock is considered optimal and needs no adjustment.

Thus, depending on the value loaded into the reference counter, the time duration of the subsequent learning cycle may be longer than, shorter than, or equal to N−1 sample periods. The transition, however, is generated at a fixed location between periods N/2 and N/2−1.

Figure 2:
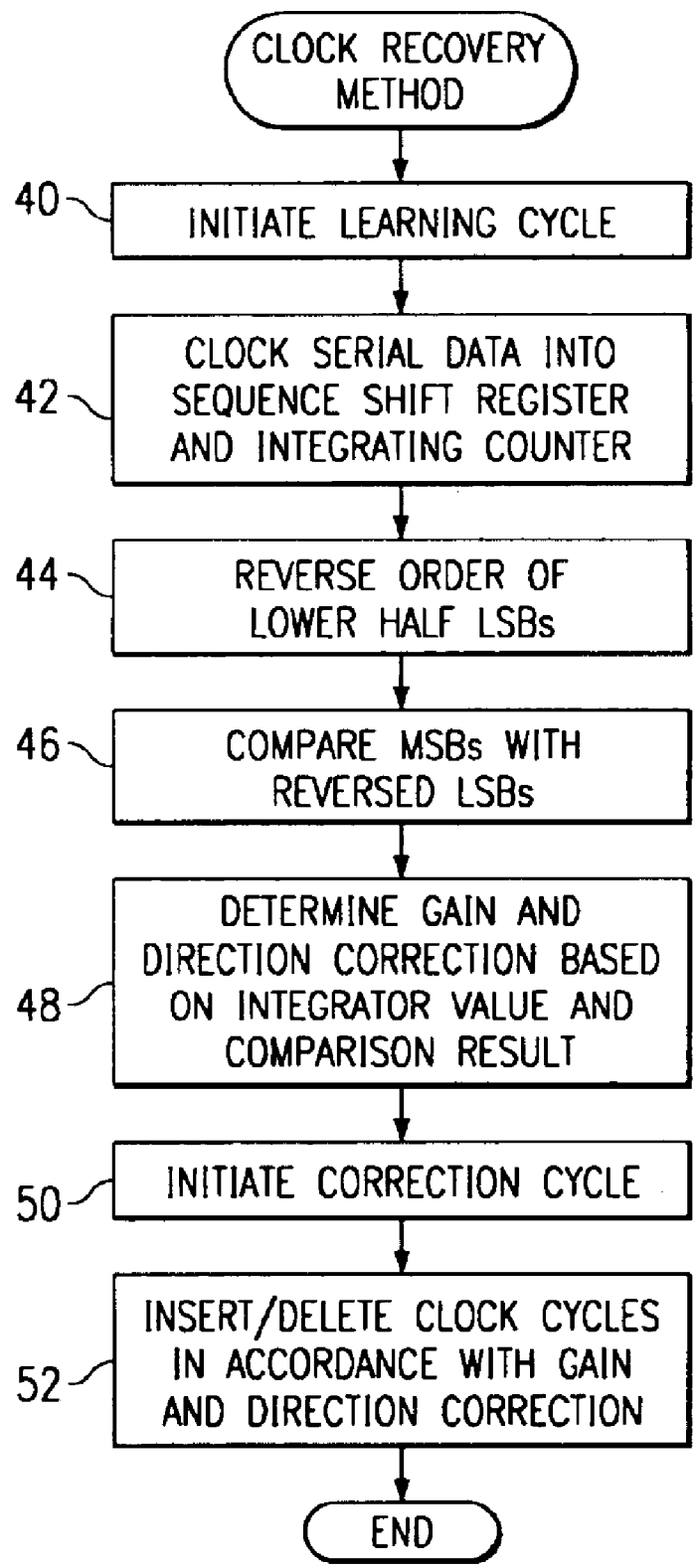
FIG. 2 is a flow diagram illustrating the clock recovery method of the present invention.

A flow diagram illustrating the clock recovery method of the present invention is shown in FIG. 2. As described above, the control unit is operative to divide the operation of the correction circuit into learning cycles and correction cycles with the learning cycle initiated first (step 40). The input received serial data is clocked into the sequence shift register and the integrating counter (step 42).

The bit positions of the lower N/2 bits are then reversed (step 44) and the most significant N/2 bits are then compared with the reversed least significant N/2 bits (step 46). The gain and direction correction values are determined as a function of the comparison result and the integrator value, as described above using the lookup tables or equivalents thereof (step 48). For example, the contents of the lookup tables may be stored in the memory of a computer and the timing correction values computed using software.

Following the learning cycle, the correction cycle is initiated (step 50). At the beginning of the correction cycle, the timing correction value is applied to the recovery clock signal (step 52). A number of clock periods equal to the gain are inserted or deleted in accordance with the gain and direction correction values as described hereinabove.

Figure 3:
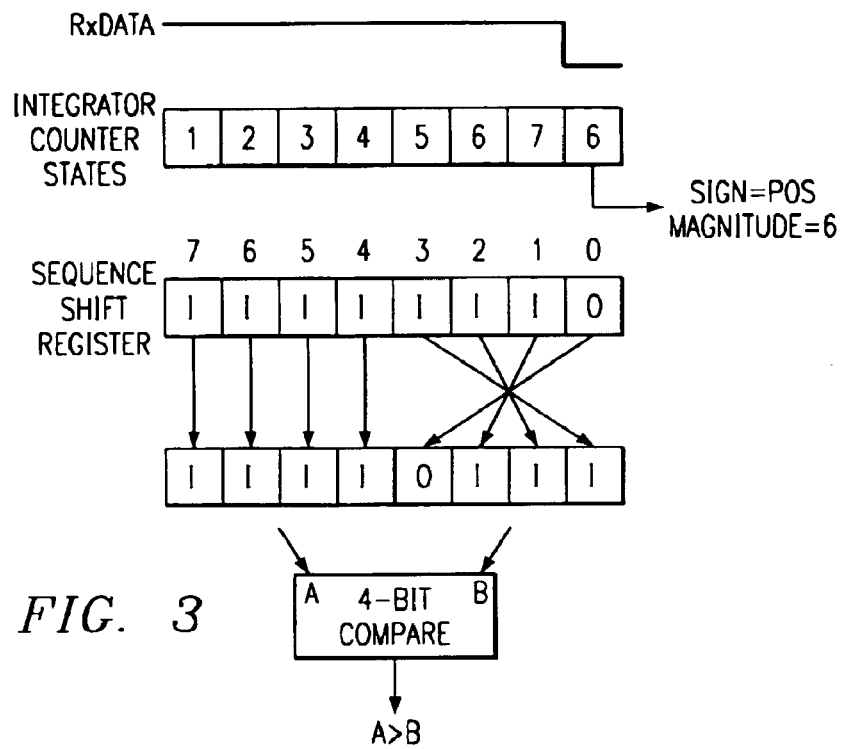
FIG. 3 is a diagram illustrating a first example of the operation of the clock recovery mechanism of the present invention.

A diagram illustrating a first example of the operation of the clock recovery mechanism of the present invention is shown in FIG. 3. In this example, the receive data is high for 7 oversampling clocks and low for the last clock, as indicated by the value of 0xFE in the sequence shift register after 8 oversampling clocks. The states of the integrator counter are as shown with the final value being +6. After reversing the lower 4 bits of the sequence shift register, the upper 4 bits (A) are compared against the lower 4 bits (B) with the result being A>B.

The signals magnitude=6, sign=positive and compare result of A>B are input to the correction circuit. In response, the output of the correction circuit indicates an adjustment in the timing of the recovered clock by 1 in the left direction, i.e. the timing is advanced by one clock period. The reference counter is loaded with a value of 6 rather than 7 in this case. This causes the positive transition in the recovered clock to occur one clock earlier thus synchronizing the recovered clock with the received data.

Figure 4:
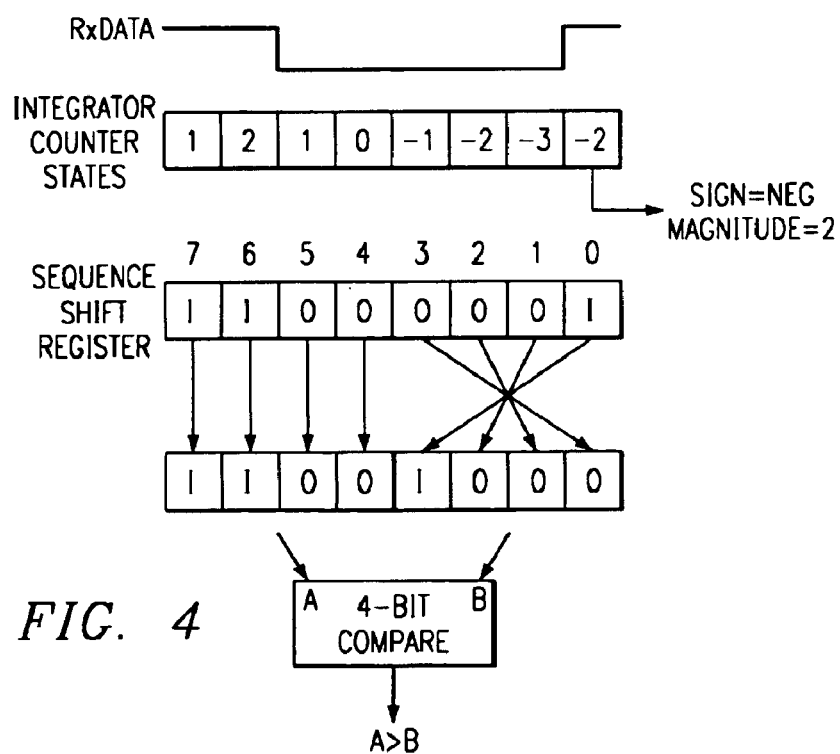
FIG. 4 is a diagram illustrating a second example of the operation of the clock recovery mechanism of the present invention.

A diagram illustrating a second example of the operation of the clock recovery mechanism of the present invention is shown in FIG. 4. In this example, the receive data is high for 2 oversampling clocks, low for the following 5 clocks and high for the last clock as indicated by the value of 0xA1 in the sequence shift register after 8 oversampling clocks. The states of the integrator counter are as shown with the final value being −2. After reversing the lower 4 bits of the sequence shift register, the upper 4 bits (A) are compared against the lower 4 bits (B) with the result being A>B.

The signals magnitude=2, sign=negative and compare result of A>B are input to the correction circuit. In response, the output of the correction circuit indicates an adjustment in the timing of the recovered clock by 2 in the right direction, i.e. the timing is retarded by two clock periods. The reference counter is loaded with a value of 9 rather than 7 in this case. This causes the positive transition in the recovered clock to occur two clock periods earlier thus moving the recovered clock towards better synchronization with the received data.

Figure 5:
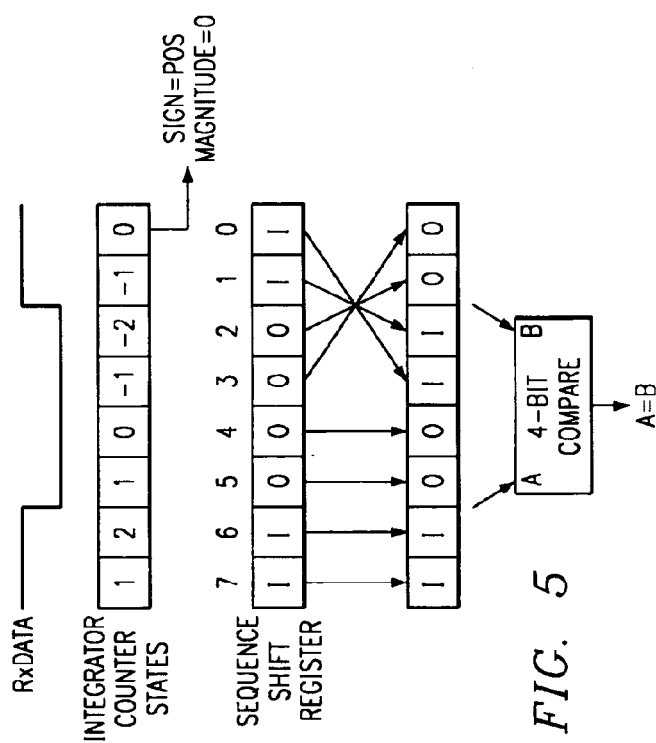
FIG. 5 is a diagram illustrating a third example of the operation of the clock recovery mechanism of the present invention.

A diagram illustrating a third example of the operation of the clock recovery mechanism of the present invention is shown in FIG. 5. In this example, the receive data is high for 2 oversampling clocks followed by a low for 4 clocks and low for the last two clocks, as indicated by the value of 0xC3 in the sequence shift register after 8 oversampling clocks. The states of the integrator counter are as shown with the final value being 0. After reversing the lower 4 bits of the sequence shift register, the upper 4 bits (A) are compared against the lower 4 bits (B) with the result being A=B.

The signals magnitude=0, sign=positive and compare result of A=B are input to the correction circuit. In response, the output of the correction circuit indicates no adjustment in the timing of the recovered clock, i.e. the timing is optimal, or it is not known which way to adjust the timing since the received sample pattern is symmetrical. The reference counter is loaded with the nominal value of 7 in this case. This causes the positive transition in the recovered clock to occur at the nominal point in time.

Figure 6:
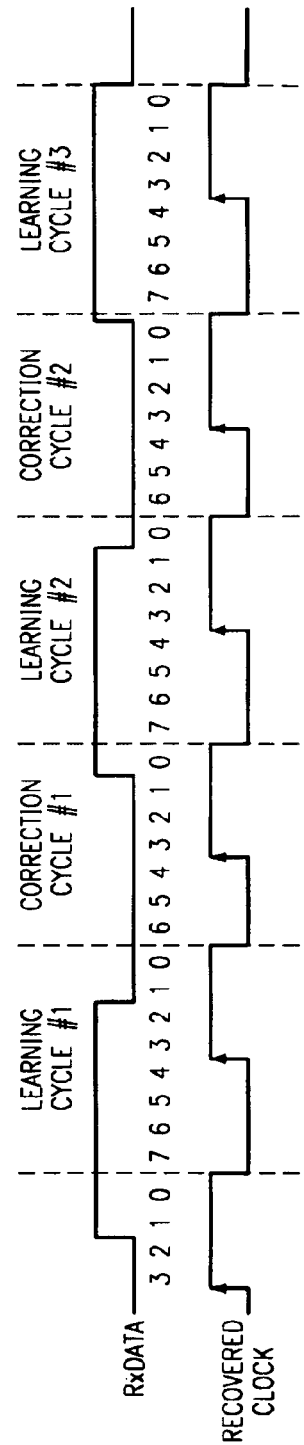
FIG. 6 is a timing diagram illustrating the operation of the clock recovery mechanism of the present invention.

A timing diagram illustrating the operation of the clock recovery mechanism of the present invention is shown in FIG. 6. In this example, the waveforms for the received data in relation to the recovered clock signal are shown. The sampling periods are divided into learning and correction cycles. In learning cycle #1, the clock transition occurs too late in the bit time. In this case, it is desired to advance the timing so that the transition occurs earlier. During this learning cycle, the correction circuit generates a gain of 1 and direction of left. Thus, the reference counter is preloaded with the value 6 rather than 7 causing the timing to be advanced one oversampling clock period during the following correction cycle #1.

Since the timing is still skewed to the right, the correction circuit again generates a gain of 1 and direction of left during learning cycle #2. This timing correction is applied during correction cycle #2 by preloading the reference counter with the value 6 once again. The recovered clock is now synchronized as shown in learning cycle #3 wherein the correction circuit produces a result of no change since the upper and lower halves of the sequence shift register are now equal. Now, the clock timing of the received data is optimal with the sampling occurring in the middle of the bit period.

Thus, the clock recovery unit of the present invention is operative to always seek out the middle of a bit period which is the optimum point for sampling the received data (least likely to be in error). Note that the fastest synchronization is achieved if the received data comprises an alternating series of ones and zeros. The invention will work, however, on any random pattern of received data but the lock times may be extended. In the case of all ones or zeros, the clock recovery unit will not change sampling timing until transitions are received.

Computer Embodiment

In another embodiment, a computer is operative to execute software adapted to perform the clock recovery mechanism of the present invention. The system may be incorporated within a communications device such as a PDA, cellular telephone, cable modem, broadband modem, wireless transceiver, laptop, PC, network transmission or switching equipment, network device or any other wired or wireless communications device. The device may be constructed using any combination of hardware and/or software.

The computer system comprises a processor which may be implemented as a microcontroller, microprocessor, microcomputer, ASIC core, FPGA core, central processing unit (CPU) or digital signal processor (DSP). The system further comprises static read only memory (ROM) and dynamic main memory (e.g., RAM), all in communication with the processor. The processor is also in communication, via a bus, with a number of peripheral devices that are also included in the computer system.

The device is optionally connected to a network, e.g., LAN or WAN, such as the Internet. The interface comprises wired and/or wireless interfaces to one or more communication channels. Communications I/O processing circuitry transfers data between the network and the processor.

An optional user interface responds to user inputs and provides feedback and other status information. A host interface connects a host computing device to the system. The host is adapted to configure, control and maintain the operation of the system. The system may also comprise a magnetic storage device for storing application programs and data. The system comprises computer readable storage medium which may include any suitable memory means including but not limited to magnetic storage, optical storage, semiconductor volatile or non-volatile memory, biological memory devices, or any other memory storage device.

Software adapted to implement the functionality of the clock recovery mechanism of the present invention is adapted to reside on a computer readable medium, such as a magnetic disk within a disk drive unit. Alternatively, the computer readable medium may comprise a floppy disk, Flash memory card, EPROM, EEROM, EEPROM based memory, bubble memory storage, ROM storage, etc. The software adapted to perform clock recovery method of the present invention may also reside, in whole or in part, in the static or dynamic main memories or in firmware within the processor of the computer system (i.e. within internal memory of the microcontroller, microprocessor, microcomputer, DSP, etc.).

In alternative embodiments, the method of the present invention may be applicable to implementations of the invention in integrated circuits, field programmable gate arrays (FPGAs), chip sets or application specific integrated circuits (ASICs), wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. An apparatus for recovering the clock from an input serial data stream, comprising:

an N bit sequence shift register adapted to receive said serial data;

a comparator adapted to compare an upper half of said sequence shift register against a lower half thereof to produce a comparison result;

an integrator adapted to integrate said input serial data stream to produce an integrator result;

a correction circuit operative to generate a timing correction comprising direction and gain portions thereof based on said comparison result and said integrator result during a learning cycle; and a clock generator circuit adapted to generate a recovered clock signal and to either retard, advance or not change the timing of said recovered clock signal in accordance with said timing correction during a correction cycle.

2. The apparatus according to claim 1, wherein said clock generator circuit applies said timing correction by adding or removing zero or more clock periods to or from said correction cycle whose initial or nominal length is N clock periods.

3. The apparatus according to claim 1, wherein said clock generator circuit is adapted to generate a clock transition between the N/2 and N/2−1 clock periods during said learning cycle.

4. The apparatus according to claim 1, wherein said clock generator circuit is adapted to generate a clock transition between the N/2 and N/2−1 clock periods during said correction cycle.

5. The apparatus according to claim 1, wherein said N is a number the result of a ratio between an oversampling rate and the receive data bit rate.

6. The apparatus according to claim 1, wherein said upper half of said sequence shift register comprises most significant N/2 bits thereof wherein N is a number the result of a ratio between an oversampling rate and the receive data bit rate.

7. The apparatus according to claim 1, wherein said lower half of said sequence shift register comprises least significant N/2 bits thereof wherein N is a number the result of a ratio between an oversampling rate and the receive data bit rate.

8. The apparatus according to claim 1, wherein said clock generator comprises a reference counter operative to preload said timing correction at the start of each said correction cycle and to preload a fixed value of N−1 during learning cycles.

9. The apparatus according to claim 1, wherein said correction circuit comprises a direction look up table (LUT) adapted to generate said timing correction comprising left, right or no change signals in accordance with the sign of said integrator result and said comparator result.

10. The apparatus according to claim 1, wherein said correction circuit comprises a gain look up table (LUT) adapted to generate said timing correction comprising a gain signal in accordance with the magnitude of said integrator result.

11. The apparatus according to claim 1, wherein said correction circuit comprises:
a direction circuit adapted to generate 'left', 'right' or 'no change' signals in accordance with the sign of said integrator result and said comparator result;
a gain circuit adapted to generate a gain signal in accordance with the magnitude of said integrator result; and
a data load circuit adapted to generate said timing correction as a function of said 'left', 'right', 'no change' and gain signals.

12. The apparatus according to claim 1, wherein said clock generator comprises a counter adapted to be preloaded with a value of N−1 plus said gain to retard the timing of said recovered clock signal.

13. The apparatus according to claim 1, wherein said clock generator comprises a counter adapted to be preloaded with a value of N−1 minus said gain to advance the timing of said recovered clock signal.

14. An apparatus for recovering the clock from an input serial data stream, comprising:
means for initiating learning cycles during which a timing correction is generated and to initiate correction cycles during which said timing correction is applied to a recovered clock signal;
an N bit sequence shift register adapted to receive said serial data;
a comparator adapted to compare an upper half of said sequence shift register against a lower half thereof to produce a direction signal therefrom;
an integrator adapted to integrate said input serial data stream to produce a gain signal, said integrator adapted to be reset at the start of each learning cycle;
a correction circuit operative to produce during learning cycles direction and gain corrections base don said direction signal and said gain signal; and
a clock generator circuit adapted to generate said recovered clock and to adjust during correction cycles the timing of said recovered clock in accordance with said direction and gain corrections.

15. The apparatus according to claim 14, wherein said clock generator circuit comprises a counter adapted to be preloaded with a value of N−1 plus said gain correction to retard the timing of said recovered clock signal.

16. The apparatus according to claim 14, wherein said clock generator circuit comprises a counter adapted to be preloaded with a value of N−1 minus said gain correction to advance the timing of said recovered clock signal.

17. An apparatus for recovering the clock from an input serial data stream, comprising:
an N bit sequence shift register adapted to receive said serial data;
comparator means for comparing an upper half of said sequence shift register against a lower half thereof to produce a direction signal;
an integrator adapted to integrate said input serial data stream to produce a gain signal;
correction means for generating during a learning cycle a direction correction and a gain correction based on said direction signal and gain signal; and
a clock generator circuit adapted to generate a recovered clock signal whose timing is adjusted in accordance with said direction correction and gain correction during a correction cycle adapted to follow said learning cycle.

18. The apparatus according to claim 17, wherein said clock generator circuit is adapted to either retard, advance or not change the timing of said recovered clock signal in accordance with said direction correction.

19. The apparatus according to claim 17, wherein said clock generator circuit comprises a counter adapted to be preloaded with a value of N−1 plus said gain correction to retard the timing of said recovered clock signal.

20. The apparatus according to claim 17, wherein said clock generator circuit comprises a counter adapted to be preloaded with a value of N−1 minus said gain correction to advance the timing of said recovered clock signal.

21. The apparatus according to claim 17, wherein said clock generator circuit is adapted such that said direction correction determines whether said recovered clock signal is to be retarded, advanced or not changed while the degree of any retarding or advancing of the timing is determined by said gain correction.

22. A method of recovering a clock from an input serial data stream, said method comprising the steps of:
initiating learning cycles during which a timing correction is generated and initiating correction cycles during which said timing correction is applied to a recovered clock signal;
loading said serial data into an N bit sequence shift register;
comparing an upper half of said sequence shift register against a lower half thereof so as to produce a directions signal therefrom;
integrating said serial data stream so as to produce a gain signal;
generating during learning cycles said timing correction comprising direction and gain corrections based on said direction signal and said gain signal; and
generating said recovered clock signal whereby the timing of said recovered clock is adjusted in accordance with said direction and gain corrections during correction cycles.

* * * * *